US011402239B2

(12) United States Patent
Aleman et al.

(10) Patent No.: US 11,402,239 B2
(45) Date of Patent: Aug. 2, 2022

(54) MAGNETIC-BASED TRACKING SYSTEM

(71) Applicant: Microchip Technology Incorporated, Chandler, AZ (US)

(72) Inventors: Enrique Aleman, Gilbert, AZ (US); Monte Denton, Gilbert, AZ (US); Keith Edwin Curtis, Queen Creek, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 490 days.

(21) Appl. No.: 16/707,219

(22) Filed: Dec. 9, 2019

(65) Prior Publication Data

US 2021/0108945 A1 Apr. 15, 2021

Related U.S. Application Data

(60) Provisional application No. 62/913,248, filed on Oct. 10, 2019.

(51) Int. Cl.
*G01D 5/245* (2006.01)
*G06Q 30/02* (2012.01)
(Continued)

(52) U.S. Cl.
CPC ......... *G01D 5/2451* (2013.01); *G05D 1/0272* (2013.01); *G06Q 30/0201* (2013.01); *G06F 1/14* (2013.01)

(58) Field of Classification Search
CPC ............................................ G01D 5/12–2525
See application file for complete search history.

(56) References Cited

U.S. PATENT DOCUMENTS

2007/0143006 A1\* 6/2007 Plettner ................... G01S 13/02
340/988
2012/0287280 A1\* 11/2012 Essati ................... G01C 21/005
382/104
(Continued)

FOREIGN PATENT DOCUMENTS

WO 2006/102183 A2 9/2006 ............. G01C 21/00

OTHER PUBLICATIONS

International Search Report and Written Opinion, Application No. PCT/US2020/027365, 15 pages, dated Jul. 7, 2020.

*Primary Examiner* — Huy Q Phan
*Assistant Examiner* — David B Frederiksen
(74) *Attorney, Agent, or Firm* — Slayden Grubert Beard PLLC

(57) ABSTRACT

A vehicle movement tracking system that employs floor mats for generating location information using magnetic stripes, detectable with a magnetic sensor in a wheel of the vehicle. Two sensors are in a wheel of a vehicle. One sensor senses wheel rotation, and the other sensor senses a magnetic. The vehicle passes over a floor mat comprising magnetic stripes thereon that code the mat and thereby indicate the location at which the mat is at. When the vehicle travels over this mat, the magnetic sensor in the wheel detects the magnetic stripes and the wheel rotation sensor detects the distance between the magnetic stripes. In combination, these two sensors are used to create a location word that denotes the mat over which the vehicle passes over. The location word is stored in non-volatile memory and later uploaded to a location collection station.

20 Claims, 4 Drawing Sheets

(51) Int. Cl.
*G05D 1/02* (2020.01)
*G06F 1/14* (2006.01)

(56) References Cited

U.S. PATENT DOCUMENTS

| | | | |
|---|---|---|---|
| 2014/0343846 A1* | 11/2014 | Goldman | G05D 1/0272 701/525 |
| 2015/0008076 A1* | 1/2015 | Muller | B66B 5/0031 187/394 |
| 2018/0178822 A1 | 6/2018 | Carter et al. | |

* cited by examiner

MAGNETIC-BASED TRACKING SYSTEM

RELATED PATENT APPLICATION

This application claims priority to commonly owned U.S. Provisional Patent Application Ser. No. 62/913,248; filed Oct. 10, 2019; entitled "Magnetic-Based Tracking System," and is hereby incorporated by reference herein for all purposes.

TECHNICAL FIELD

The present disclosure relates to tracking systems and, more particularly, to magnetic-based tracking systems.

BACKGROUND

Tracking a vehicle's movement through a closed environment has been problematic, especially when trying to do so with low power implementations. Global Positioning System (GPS) has been used and works for higher power systems but requires continuous reception to maintain location information. Use of GPS is also problematic in steel building. Another tracking option has been to put bar codes on the floor, but they fail to be properly read due to dirt and wear that renders them unusable. Yet another tracking option has been to use energized magnetic coils in the floor to couple data to the vehicles, but this requires power and active circuitry in the floor. A vehicle is a thing used for transporting people, animals or goods, especially on land, such as for example but not limited to a car, truck or cart.

An application for tracking vehicles is the desire of retail stores to track shopping habits of its customers. It is important to retail stores to know which areas of marketing displays gather interest, and which areas capture interest, but the associated products don't sell. Which areas of the store have the most traffic, and which have the least. What areas of the store are congested and at what times?

SUMMARY

Therefore, what is needed is a low power, simple and cost-effective solution for tracking material or vehicles operating in a closed environment.

According to an embodiment, a magnetic-based tracking system may comprise: a vehicle having wheels on a surface of a substrate that the vehicle travels over; a plurality of magnetic stripes on the substrate, wherein some of the magnetic stripes may be spaced a first distance and others of the magnetic stripes may be spaced a second distance, whereby the first distance represents a first logic value and the second distance represents a second logic value, and the first distance may be greater than the second distance; and one of the wheels of the vehicle may comprise a digital processor, a rotation sensor coupled to the digital processor, a magnetic sensor coupled to the digital processor, a non-volatile memory coupled to the digital processor, a real-time clock coupled to the digital processor, a wireless communications device coupled to the digital processor, and a power source; wherein when the magnetic sensor detects a magnetic stripe the digital processor may be notified and the rotation sensor provides a wheel rotation value until a next magnetic stripe may be detected, a first logic value may be determined when the wheel rotation value may be greater than a predetermined rotation value and a second logic value may be determined when the wheel rotation value may be not greater than the predetermined rotation value, the first or second logic value may be stored; and detection of another magnetic stripe and another next magnetic stripe continues for determining first or second logic values until the stored first and/or second logic values complete a location word, wherein the location word and an associated time stamp may be stored in the non-volatile memory.

According to a further embodiment, a microcontroller may provide the digital processor, non-volatile memory, and real-time clock. According to a further embodiment, the magnetic sensor may comprise a single-axis giant magnetoresistance (GMR) sensor. According to a further embodiment, the rotation sensor may comprise a two-axis giant magnetoresistance (GMR) sensor. According to a further embodiment, a location collection station may be provided for uploading the stored location words and associated time stamps, wherein when the vehicle travels over an upload coded substrate the stored location words and associated time stamps may be sent via the wireless communications device to the location collection station. According to a further embodiment, the wireless communications device may use LoRa communications. According to a further embodiment, the wireless communications device may use communications selected from the group consisting of Wi-Fi, Bluetooth, Zigbee and Z-Wave. According to a further embodiment, the first logic level may be a logic "0" and the second logic level may be a logic "1". According to a further embodiment, the first logic level may be a logic "1" and the second logic level may be a logic "0". According to a further embodiment, the vehicle may be selected form the group consisting of shopping cart, grocery cart, materials handling vehicle, fork-lift, hand cart, hand truck, platform truck, wheelbarrow and transportation vehicle.

According to another embodiment, a method for tracking a vehicle using a magnetic-based tracking system may comprise the steps of: detecting magnetic stripes on a substrate with a magnetic sensor located in a wheel of a vehicle rolling over the magnetic stripes on the substrate; measuring angular rotations of the wheel between occurrences of the detected magnetic stripes; comparing each of the measured angular rotations to a predetermined angular rotation value, wherein if the measured angular rotation may be great than the predetermined angular rotation value then store a first logic value into a location word, and if not greater than the angular rotation value then store a second logic value into the location word until complete; and time stamping the completed location word and storing the time in a non-volatile memory.

According to a further embodiment of the method, may comprise the step of storing a plurality of completed location words and respective time stamps representing where and when the vehicle rolled over a plurality of substrates at different locations. According to a further embodiment of the method, may comprise the step of uploading the plurality of completed location words and respective time stamps to a location collection station. According to a further embodiment of the method, the step of uploading the plurality of completed location words and respective time stamps may comprise the step of uploading the plurality of completed location words and respective time stamps to the location collection station when an upload location word may be determined after the vehicle wheel passes over an upload coded substrate. According to a further embodiment of the method, the step of uploading the plurality of completed location words and respective time stamps may comprise the step of uploading the plurality of completed location words and respective time stamps to the location collection station when the wheel of the vehicle may be proximate thereto.

According to a further embodiment of the method, the first logic level may be a logic "0" and the second logic level may be a logic "1". According to a further embodiment of the method, the first logic level may be a logic "1" and the second logic level may be a logic "0". According to a further embodiment of the method, the substrate may be moveable to different locations. According to a further embodiment of the method, the plurality of substrates may be a plurality of mats, wherein the plurality of mats may be moveable to different locations. According to a further embodiment of the method, may comprise the step of date stamping the completed location word and storing the date in the non-volatile memory.

BRIEF DESCRIPTION OF THE DRAWINGS

A more complete understanding of the present disclosure may be acquired by referring to the following description taken in conjunction with the accompanying drawings wherein.

Figure 1:
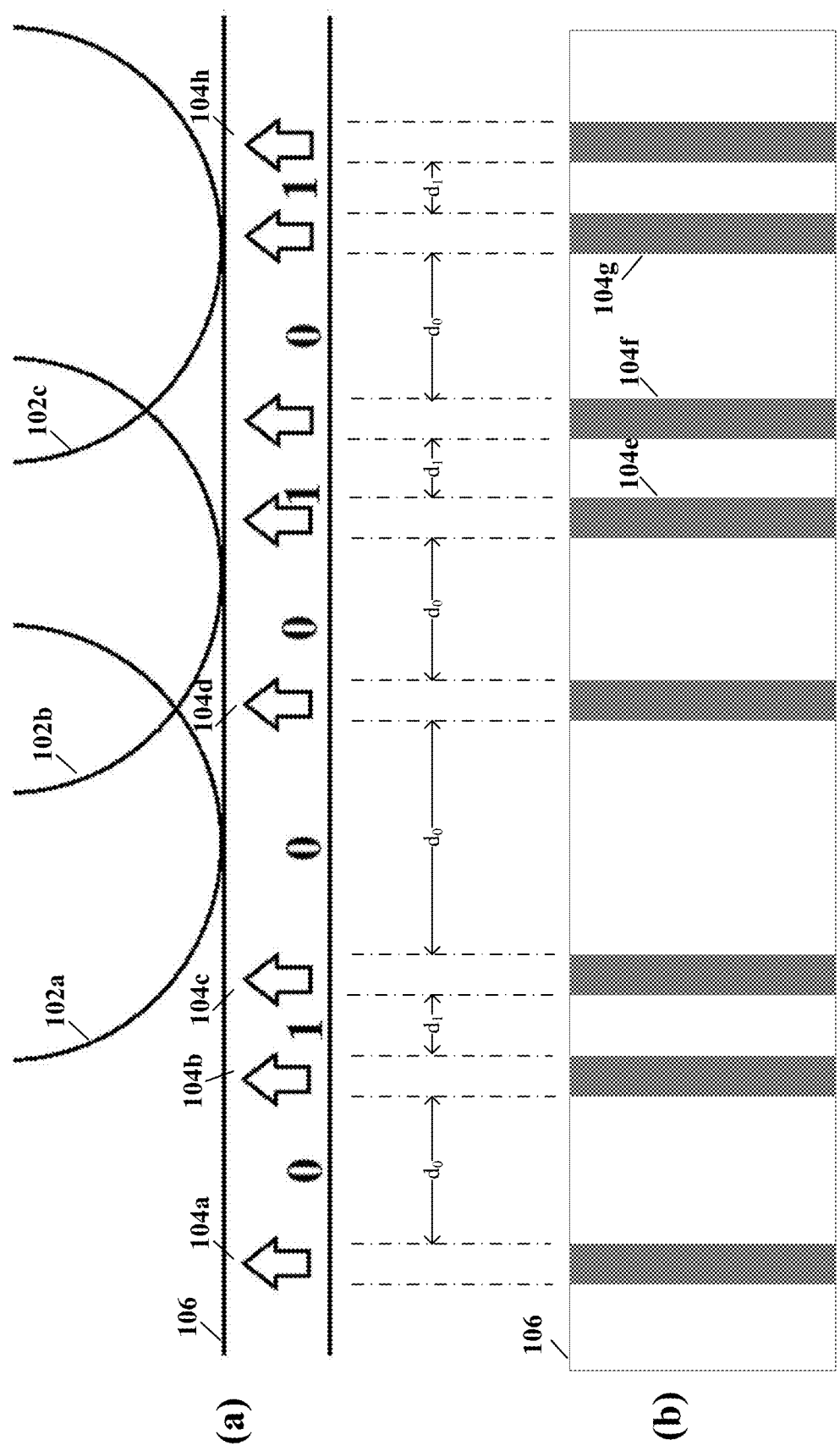
FIG. 1 illustrates schematic elevational and plan views of a mat comprising magnetic stripes and a magnetic sensing wheel for vehicle location tracking, according to specific example embodiments of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

Embodiments of the present disclosure comprise two sensors located in a wheel of a vehicle. One sensor senses wheel rotation, and the other sensor senses a magnetic field. The vehicle passes over a mat (substrate) on a floor comprising magnetic stripes thereon that may be used to code the mat and thereby the location at which the mat is at. When the vehicle travels over this mat, the magnetic sensor in the wheel detects the magnetic stripes and in combination with the information from the wheel rotation sensor decodes these magnetic stripes into binary values that denote the mat over which the vehicle is passing, recorded in the vehicle wheel and later downloaded (read electronically) to determine where and when the vehicle was at. It is contemplated and within the scope of this disclosure that a vehicle having at least one wheel may comprise a shopping cart, grocery cart, materials handling vehicle, e.g., fork-lift, hand cart, hand truck, platform truck, wheelbarrow; and transportation vehicle. The mat may be movable and/or embedded into a floor surface. A floor surface may comprise the magnetic stripes on a substrate. The magnetic stripes may be, for example but are not limited to, magnetic polymer material.

The two sensors and associated electronics are in one wheel of the vehicle and may be sealed against contamination. The sensor and location collection electronics are low power and need only store data when the magnetic strips defining the coded mat and location thereof are detected. A particular location word may be used to trigger a wireless transmission of accumulated location words to a data collection receiver for further processing thereof. Wireless charging of a battery in the wheel for powering the wheel sensor and location collection electronics may also be implemented at storage locations for the vehicle.

The embodiments of the present disclosure are simple to implement and very cost effective. No modifications to the vehicle are required except to replace one of its wheels with a magnetic sensing wheel as described hereinabove. The mats having magnetic stripes thereon may be molded and be easily repositioned as location detection requirements change. The embodiments described herein may be easily scaled from small vehicles such as shopping carts to large vehicles such as trucks.

Advantages of the embodiments disclosed herein are that the active electronics are only required in one wheel of each vehicle, and at the data collection receiver. Location coding mats may be passive, and locations thereof may be reprogrammed by physically moving a mat to a new location. The electronics have low power requirements because the location determination may be based upon binary digits determined by wheel rotation triggered by magnetic strip detection. Therefore, most of the wheel electronics may be in a low power sleep mode most of the time with a comparator and a magnetic detection sensor the only continuously active electronic components in the wheel. Transmission of stored locations may occur when the vehicle wheel runs over a specifically coded mat, when the vehicle wheel is proximate to a location collection receiver, and/or a RF interrogation signal from the location collection receiver is received by the "smart wheel."

Referring now to the drawings, the details of example embodiments are schematically illustrated. Like elements in the drawings will be represented by like numbers, and similar elements will be represented by like numbers with a different lower-case letter suffix.

Referring to FIG. 1, depicted are schematic elevational and plan views of a mat comprising magnetic stripes and a magnetic sensing wheel for vehicle location tracking, according to specific example embodiments of this disclosure. A drawing (a) shows an elevational view of a mat 106 having magnetic stripes 104a, 104b . . . 104h, generally 104, spaced apart either by distant do or di, where do is greater than di. A drawing (b) shows a plan view of the mat 106. A wheel 102 is shown at three different positions represented by wheels 102a, 102b, 102c, each of which indicate a different position for the wheel 102, as it rolls over the magnetic stripes 104 and detects the magnetic stripe it is proximate to. By detecting when the wheel 102 detects the magnetic stripe, and the amount of wheel rotation between detections of the magnetic stripes, logic "1s" and "0s" may be decoded from the mat 106. For example, when traversing from magnetic strips 104a to 104b, i.e., over distance do, a logic 0 may be recorded, without limitation. When traversing from magnetic strips 104b to 104c, i.e., over distance di, a logic 1 may be recorded, without limitation. This location word may be unique to a particular mat 106 and the location of the mat 106 will correlate to the location of the vehicle when it passes over the mat 106. Electronics in the wheel 102 may time (and date) stamp the location word indicating the time/date at which the wheel 102 passed over the particular mat 106. A plurality of such location words may be stored in the electronics of the wheel 106 to later be downloaded to a location collection receiver. In this way the vehicle location usage may be determined. The location word may further identify the direction of travel, since a different location word may be recorded for travel from ridge 104*h* towards ridge 104*a* that the location word recorded for travel from ridge 104*a* towards ridge 104*h*.

Figure 2:
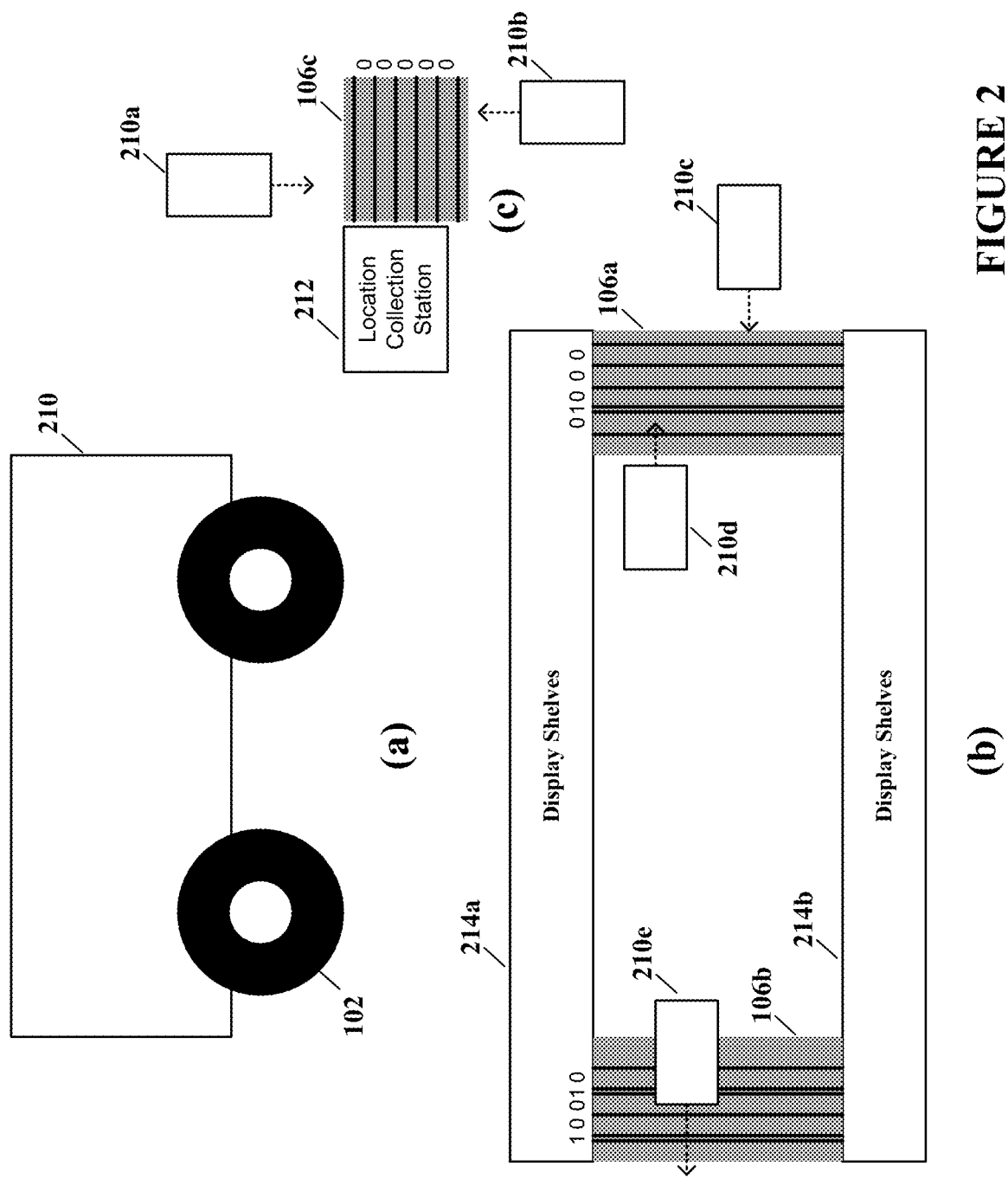
FIG. 2 illustrates schematic plan views of magnetic stripe substrates and vehicles each having a magnetic sensing wheel and an elevational view of a vehicle with a magnetic sensing wheel, according to specific example embodiments of this disclosure.

Referring to FIG. 2, depicted are schematic plan views of magnetic stripe mats and vehicles each having a magnetic sensing wheel and an elevational view of a vehicle with a magnetic sensing wheel, according to specific example embodiments of this disclosure. A plurality of mats 106 may be arranged in a store, for example but not limited to, at each end of two rows of display or product shelves 214 so that when a vehicle 210*c* comes into this shelf area a mat 106*a* will cause the vehicle 210*c* to record a location word 01000, e.g., the first set of magnetic stripes 104 detected may be the least significant bit (LSB) and the last set of magnetic stripes 104 detected may be the most significant bit (MSB), or vice versa. When a vehicle 210*d* leaves this area the mat 106*a* will be decoded as 00010, thus indicating which direction the vehicle 210 was traveling (in or out of area). Mat 106*b* provides tracking of vehicles coming in and going out of the shelve 214 area, and the location code may be 01001 going out and 10010 going in.

A location collection station 212 may be used to retrieve the time stamped recorded location words from each vehicle 210 that passes over the mat 106*c*. When a vehicle 210*a* passes over the mat 106*c* a location word 00000 will be detected and the vehicle 210*a* may be programed to upload its time stamped recorded location words upon detection of that code. Vehicle 210*b* will also detect the location word 00000 going over the mat 106*c* in the other direction, and thereafter upload its stored location words comprising the location history traveled by the vehicle 210.

Figure 3:
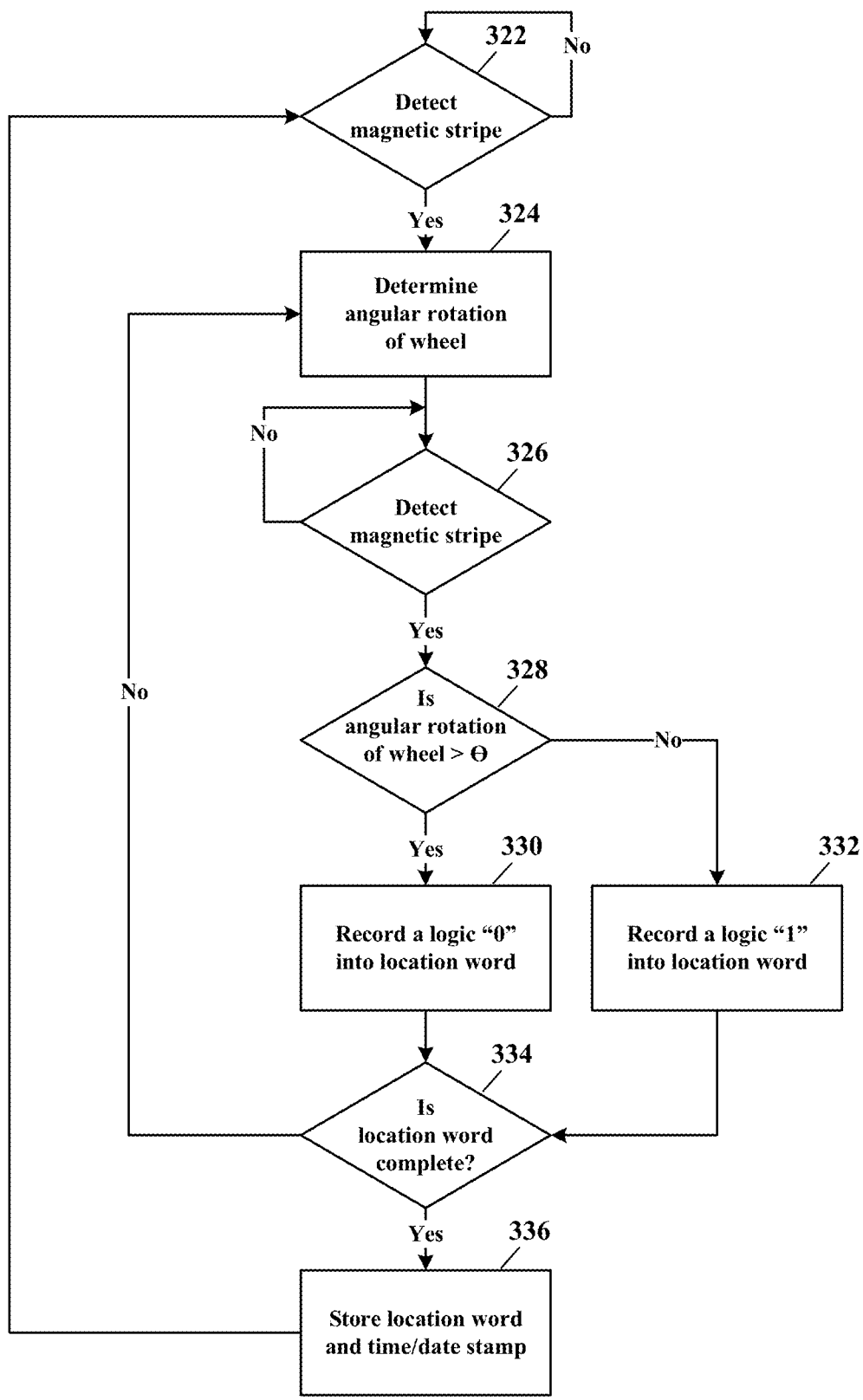
FIG. 3 illustrates a schematic flow diagram for recording location words from the magnetic sensing wheel, according to specific example embodiments of this disclosure.

Referring to FIG. 3, depicted is a schematic flow diagram for recording location words from the magnetic sensing wheel, according to specific example embodiments of this disclosure. In step 322 the electronics in the wheel 102 becomes active upon detection of a magnetic stripe 104 by the magnetic detector in the wheel 102. In step 324 the angular rotation of the wheel 102 is determined until in step 326 another magnetic stripe 104 is detected. In step 328 the determined angular rotation of the wheel 102 is compared to a predetermined angular rotation value, $\theta$, and if great than the angular rotation value, $\theta$, then go to step 330. If not greater than the predetermined angular rotation value, $\theta$, then go to step 332.

Step 330 records a logic "0" into a location word, and step 332 records a logic "1" into the location word. Step 334 determines if enough logic bits have been recorded from steps 330 and/or 332. If so, in step 336 the location word is stored along with a time (and date) stamp into a memory, e.g., non-volatile memory. If not, then return to step 324 for further processing of angular rotation of the wheel (step 324) and detection of a magnetic stripe (step 326). It is contemplated and within the scope of this disclosure that the first logic bit input for the location word may be a least significant bit (LSB) and the last logic bit input for the location word may be a most significant bit (MSB), without limitation, and thus in other embodiments the first logic bit input for the location word may be an MSB and the last logic bit input for the location word may be an LSB. In addition to above, various additional method steps may be provided, such as a watch dog timer, or the loading of an error code into a location word in the event that at least one bit is not detected after the angular rotation is determined as exceeding a threshold significantly greater than the angular rotation value, $\theta$, indicative that at least one bit has been missed, due for example to wear or damage to the magnetic strips 104 on the floor mat 106.

Figure 4:
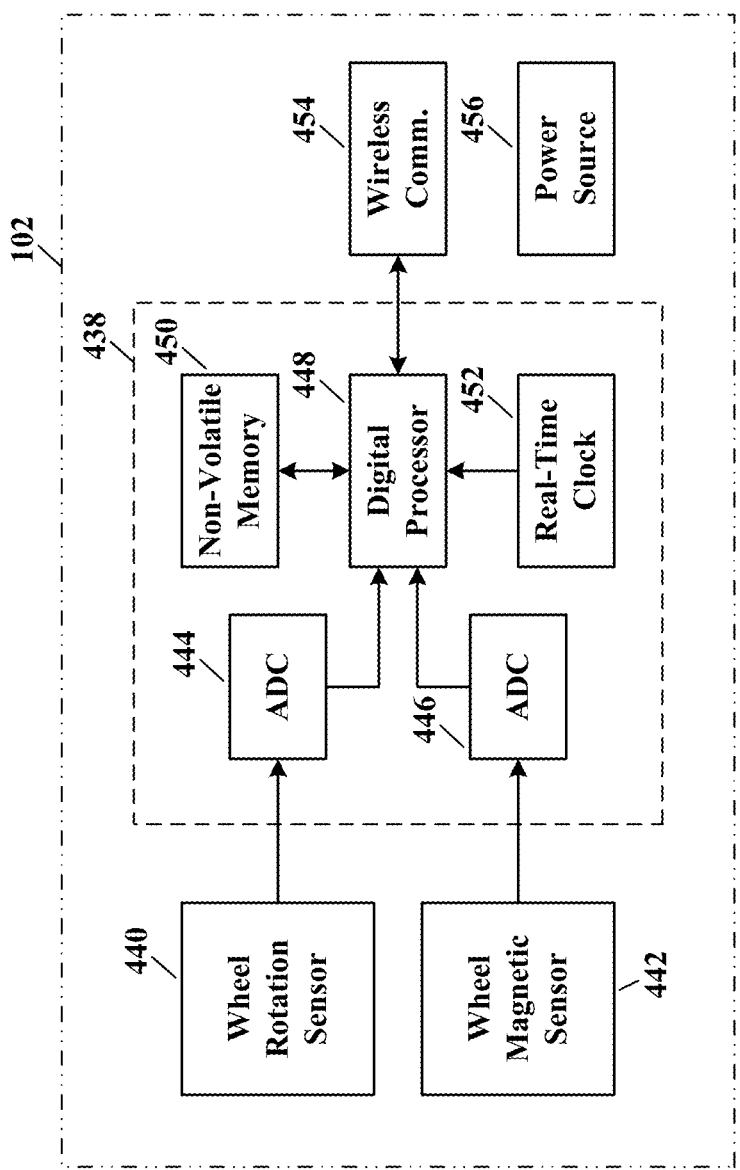
FIG. 4 illustrates a schematic block diagram of an electronic circuit implementation for a magnetic sensing wheel, according to specific example embodiments of this disclosure.

Referring to FIG. 4, depicted is a schematic block diagram of an electronic circuit implementation for a magnetic field sensing wheel, according to specific example embodiments of this disclosure. The electronics in a magnetic field sensing wheel 102 may comprise a wheel rotation sensor 440, a wheel magnetic sensor 442, analog-to-digital converters (ADC) 444 and 446, a digital processor 448, non-volatile memory 450, a real time clock 452, wireless communications 454, and a power source 456. The wheel rotation sensor 440 and the wheel magnetic sensor 442 may have analog or digital outputs. If digital, then the associated ADC 444 or 446 is (are) not necessary and a digital input to the digital processor 448 will suffice. A microcontroller 438 may be used to provide circuit functions 444-450 and may even provide wireless communications 454. The wheel rotation sensor 440 may comprise, for example but is not limited to, a two-axis giant magnetoresi stance (GMR) sensor. The wheel magnetic sensor 442 may comprise, for example but is not limited to, a single-axis giant magnetoresistance (GMR) sensor. The wireless communications 454 may be, for example but is not limited to, LoRa (Long Range), Wi-Fi, Bluetooth, Zigbee, Z-Wave, cell, etc.

It is contemplated and within the scope of this disclosure that a mat 106 may comprise a single magnetic strip that is coded with a unique magnetic code that identifies the mat 106. Then the wheel 102 only requires a magnetic sensor that can decode the unique magnetic code and no two-axis rotational sensor is required. When the unique magnetic code of the mat 106 is read by the magnetic sensor it may be stored in non-volatile memory 450 for later retrieval by the location collection station 212.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

What is claimed is:

1. A magnetic-based tracking system, said system comprising:
   a vehicle having wheels on a surface of a substrate that the vehicle travels over;
   a plurality of magnetic stripes on the substrate, wherein some of the magnetic stripes are spaced a first distance and others of the magnetic stripes are spaced a second distance, whereby the first distance represents a first logic value and the second distance represents a second logic value, and the first distance is greater than the second distance; and
   one of the wheels of the vehicle comprises
      a digital processor,
      a rotation sensor coupled to the digital processor,
      a magnetic sensor coupled to the digital processor,
      a non-volatile memory coupled to the digital processor,
      a real-time clock coupled to the digital processor,
      a wireless communications device coupled to the digital processor, and a power source;
wherein
when the magnetic sensor detects a magnetic stripe the digital processor is notified and the rotation sensor provides a wheel rotation value until a next magnetic stripe is detected,
a first logic value is determined when the wheel rotation value is greater than a predetermined rotation value and a second logic value is determined when the wheel rotation value is not greater than the predetermined rotation value,
the first or second logic value is stored; and
detection of another magnetic stripe and another next magnetic stripe continues for determining first or second logic values until the stored first and/or second logic values complete a location word, wherein the location word and an associated time stamp are stored in the non-volatile memory.

2. The magnetic-based tracking system according to claim 1, wherein a microcontroller provides the digital processor, non-volatile memory, and real-time clock.

3. The magnetic-based tracking system according to claim 1, wherein the magnetic sensor comprises a single-axis giant magnetoresistance (GMR) sensor.

4. The magnetic-based tracking system according to claim 1, wherein the rotation sensor comprises a two-axis giant magnetoresistance (GMR) sensor.

5. The magnetic-based tracking system according to claim 1, further comprising a location collection station for uploading the stored location words and associated time stamps, wherein when the vehicle travels over an upload coded substrate the stored location words and associated time stamps are sent via the wireless communications device to the location collection station.

6. The magnetic-based tracking system according to claim 1, wherein the wireless communications device use LoRa (Long Rage) communications.

7. The magnetic-based tracking system according to claim 1, wherein the wireless communications device uses communications selected from a group consisting of Wi-Fi, Bluetooth, Zigbee and Z-Wave.

8. The magnetic-based tracking system according to claim 1, wherein the first logic level is a logic "0" and the second logic level is a logic "1".

9. The magnetic-based tracking system according to claim 1, wherein the first logic level is a logic "1" and the second logic level is a logic "0".

10. The magnetic-based tracking system according to claim 1, wherein the vehicle is selected from a group consisting of shopping cart, grocery cart, materials handling vehicle, fork-lift, hand cart, hand truck, platform truck, wheelbarrow and transportation vehicle.

11. A method for tracking a vehicle using a magnetic-based tracking system, said method comprising steps of:
detecting magnetic stripes on a substrate with a magnetic sensor located in a wheel of a vehicle rolling over the magnetic stripes on the substrate;
measuring angular rotations of the wheel between occurrences of the detected magnetic stripes;
comparing each of the measured angular rotations to a predetermined angular rotation value, wherein if the measured angular rotation is great than the predetermined angular rotation value then store a first logic value into a location word, and if not greater than the angular rotation value then store a second logic value into the location word until complete; and
time stamping the completed location word and storing the time in a non-volatile memory.

12. The method according to claim 11, further comprising a step of storing a plurality of completed location words and respective time stamps representing where and when the vehicle rolled over a plurality of substrates at different locations.

13. The method according to claim 12, further comprising a step of uploading the plurality of completed location words and respective time stamps to a location collection station.

14. The method according to claim 13, wherein the step of uploading the plurality of completed location words and respective time stamps comprises the step of uploading the plurality of completed location words and respective time stamps to the location collection station when an upload location word is determined after the vehicle wheel passes over an upload coded substrate.

15. The method according to claim 13, wherein the step of uploading the plurality of completed location words and respective time stamps comprises the step of uploading the plurality of completed location words and respective time stamps to the location collection station when the wheel of the vehicle is proximate thereto.

16. The method according to claim 11, wherein the first logic level is a logic "0" and the second logic level is a logic "1".

17. The method according to claim 11, wherein the first logic level is a logic "1" and the second logic level is a logic "0".

18. The method according to claim 11, wherein the substrate is moveable to different locations.

19. The method according to claim 12, wherein the plurality of substrates are a plurality of mats, wherein the plurality of mats are moveable to different locations.

20. The method according to claim 11, further comprising a step of date stamping the completed location word and storing the date in the non-volatile memory.

* * * * *

UNITED STATES PATENT AND TRADEMARK OFFICE
CERTIFICATE OF CORRECTION

PATENT NO. : 11,402,239 B2
APPLICATION NO. : 16/707219
DATED : August 2, 2022
INVENTOR(S) : Enrique Aleman et al.

It is certified that error appears in the above-identified patent and that said Letters Patent is hereby corrected as shown below:

In the Claims

<u>Column 7</u>
Claim 6, Line 37, "(Long Rage) communications."
Change to "(Long Range) communications."

Signed and Sealed this
Fourth Day of October, 2022

Katherine Kelly Vidal
*Director of the United States Patent and Trademark Office*